US005698000A

United States Patent [19]

Moireau et al.

[11] Patent Number: 5,698,000
[45] Date of Patent: Dec. 16, 1997

[54] PROCESS FOR MANUFACTURING SIZED GLASS STRANDS

[75] Inventors: Patrick Moireau, Curienne; Timothy Johnson, Vimines, both of France

[73] Assignee: Vetrotex France, Chambery, France

[21] Appl. No.: 354,822

[22] Filed: Dec. 8, 1994

[30] Foreign Application Priority Data

Dec. 9, 1993 [FR] France ................................. 93 14795

[51] Int. Cl.$^6$ ........................... C03C 25/02; C03B 37/10
[52] U.S. Cl. ........................... 65/453; 65/447; 65/448; 65/450
[58] Field of Search ........................... 65/443, 447, 448, 65/450, 453; 428/378, 391, 392, 377

[56] References Cited

U.S. PATENT DOCUMENTS

| | | | |
|---|---|---|---|
| 3,876,404 | 4/1975 | Drummond | 65/453 |
| 4,002,445 | 1/1977 | Graham | 65/447 |
| 4,110,094 | 8/1978 | Motsinger | 65/453 X |
| 4,295,871 | 10/1981 | Droux et al. | 65/453 X |
| 4,347,278 | 8/1982 | Flautt et al. | 65/447 X |
| 4,351,752 | 9/1982 | Das et al. | 65/450 X |
| 4,397,913 | 8/1983 | Fahey | 65/447 X |
| 4,608,304 | 8/1986 | Rosthauser | 65/447 X |
| 4,745,028 | 5/1988 | Das et al. | 65/448 X |
| 4,762,750 | 8/1988 | Girgis et al. | 65/447 X |
| 5,055,119 | 10/1991 | Flautt et al. | |
| 5,352,392 | 10/1994 | Johnson et al. | |

FOREIGN PATENT DOCUMENTS

| | | |
|---|---|---|
| 0001286 | 4/1979 | European Pat. Off. . |
| 0243275 | 10/1987 | European Pat. Off. . |
| 0570283 | 11/1993 | European Pat. Off. . |

OTHER PUBLICATIONS

Abstract, JP-A-02 175 634(Sumitomo Electric Inc. Ltd.) Jul. 6, 1990.

Primary Examiner—Melvin Mayes
Attorney, Agent, or Firm—Oblon, Spivak, McClelland, Maier & Neustadt, P.C.

[57] ABSTRACT

The invention relates to a process for manufacturing continuous a glass fiber strand.

The process consists in depositing on the glass filaments which are in the process of being drawn a sizing composition of which the solvent content is less than 5 wt % of solvent selected from organic solvent and water, the solution comprising at least 70 wt % of a mixture of constituents which can be polymerized and/or crosslinked by heat treatment, at least 60 wt % of the constituents being constituents of which the molecular weight (Mw) is less than 750, less than 10 weight % being film-forming agents and 0 to 25 weight % being coupling agents, lubricants, stabilizers and initiators and/or catalysts, and in winding the strand or strands, formed by collection of the filaments, on a rotating support so as to form a wound package consisting of turns of strand coated with a non-polymerized sizing composition.

The strands are intended to reinforce thermoplastic or thermosetting organic substrates or substances of mineral origin.

14 Claims, No Drawings

1

PROCESS FOR MANUFACTURING SIZED GLASS STRANDS

BACKGROUND OF THE INVENTION

1. Field of the Invention

The present invention relates to the manufacture of glass strands which are obtained by a mechanical drawing process and which are in particular intended for reinforcing thermoplastic or thermosetting organic materials or cement-based mixtures.

2. Discussion of the Background

Continuous glass strands are obtained by mechanically drawing a large number of thin streams of molten glass flowing out of apertures in the base of a die plate in the form of continuous filaments. During the drawing process these filaments, distributed in one or more separate layers, are coated with a sizing composition by a suitable device before being collected in order to produce one or more strands. This sizing composition, which is to impart different characteristics to the glass strand, must firstly have properties imposed by the glass fiber manufacturing process. In particular it must be stable and preserve a constant composition, in spite of the shearing forces permanently caused within the sizing composition by the filaments passing therethrough at speeds of the order of several tens of meters per second.

This sizing composition then has to protect the filaments from abrasion caused by the unavoidable rubbing of the strand against various surfaces. Generally it also has to ensure the integrity of the strand, i.e., the interconnection of the filaments constituting the strand. This characteristic is important since it not only enables a strand to be easily extracted from a wound package (a form in which glass strands are frequently found) but it also restricts the number of filaments which rub directly against all the fiber-guiding devices. If the strand is to reinforce an organic substrate, the sizing composition must also facilitate the wetting by this substrate of the filaments constituting the strand.

Finally, if the glass strand is to reinforce organic substrates, the sizing composition deposited on the filaments must be chemically compatible with these substrates.

Almost all the known sizing compositions are sizing compositions in the aqueous phase which are in the form of solutions, or, far more frequently, in the form of a suspension or emulsions in water.

Before being combined with an organic substrate, the glass strands sized in this manner have to be dried in order to eliminate the water which becomes useless or even a hindrance. To this end, the wound packages are subjected to temperature cycles generally of between 110° and 150° C. for periods of time which can reach and exceed 16 hours. In effect, the amount of water to be evaporated is large since, on average, it represents at least 10 to 15 weight % of the wound package. This operation requires particular installations and a level of energy consumption of which the cost puts a strain on the production costs.

In addition, the drying of the wound packages can sometimes impair the quality of the strand when it causes irregular migration of the sizing composition constituents through the turns of the wound packages.

In order to overcome these disadvantages, it is known to dry directly the strand (U.S. Pat. No. 3,853,605) or the filaments (WO-92/05122) before the wound package is formed.

Drying the strands during the fiber-drawing operation requires the installation of devices such as ovens below each die-plate. Moreover, the efficiency of this drying method is closely linked to the manufacturing conditions such as the amount of water on the strand, the composition of the sizing composition, the drawing speed, and the number and diameter of the filaments, etc.

For the rare cases of sizing compositions composed solely of organic constituents, the glass strands coated with these sizing compositions are frequently subjected to a particular treatment before they are wound onto a rotating support. The object of this treatment is to modify the sizing composition of the strand before it is wound such that the sizing composition does not cause the turns of the wound package to adhere to one another too intensively. This adherence is liable to render the unwinding of the strand difficult, if not impossible. This treatment consists, for example, in heating the layer of filaments coated with sizing composition so as to eliminate the solvent from the sizing composition before the strand is formed as a result of the collection of the filaments (U.S. Pat. No. 3,425,862) or in polymerizing the sizing composition by subjecting the strand to the action of ultraviolet radiation (U.S. Pat. No. 5,049,407) over at least a part of its path. Here again, this type of treatment requires the installation of devices below each die plate and does not prevent the search for the best possible compromise between the integrity of the strand and its ability to be wetted by an organic substrate.

An integral strand, coated with a purely organic sizing composition, can be produced without it having to be subjected either to a heat treatment or any other treatment; it is the sizing composition alone which connects the filaments to one another. U.S. Pat. No. 4,530,860 describes sizing compositions of this type which comprise a high percentage of film-forming agent of which the essential role is to impart the integrity necessary for handling the strand.

The object of the present invention is to provide a process for manufacturing a glass strand coated with a sizing composition such that it permits the drying operation and the resultant disadvantages to be avoided.

SUMMARY OF THE INVENTION

The object of the present invention is to provide a process for manufacturing a glass strand coated with a sizing composition which is stable over time and which efficiently protects the strand from abrasion.

The object of the present invention is also to provide a glass strand which is easy to use both in operations employing textile techniques and in the production of composite products.

These different objects are achieved by a process for manufacturing a glass strand according to which a large number of continuous filaments are drawn mechanically from streams of molten glass flowing from a large number of apertures provided in the base of a die plate, the previously sized filaments are then collected in the form of one or more strands which are collected on a support, which process consists in depositing on the filaments, a sizing composition having a solvent content less than 5 weight % of solvent selected from organic solvent and water, the solution comprising at least 70 wt % of a mixture of constituents which can be polymerized and/or crosslinked by heat treatment, at least 60 weight % of the constituents being constituents of which the molecular weight (Mw) is less than approximately 750, less than 10 weight % being film-forming agents and between 0 and 25 weight % being coupling agents, lubricants, stabilizers, initiators and/or catalysts for polymerization by heat treatment, it being possible if necessary for the agents and initiators to be polymerized and/or crosslinked by heat treatment, then in winding the strand or strands, formed by the collection of the filaments, on a rotating support so as to form a wound package consisting of turns of strand coated with a non-polymerized sizing composition.

DETAILED DESCRIPTION OF THE PREFERRED EMBODIMENTS

At least 60 weight % of the mixture of constituents which can be polymerized and/or crosslinked are preferably formed of constituents of which the molecular weight (Mw) is less than approximately 500.

The constituents forming at least 60 weight % of the mixture are preferably monomers. The use of a mixture of monomers which are generally relatively reactive encourages polymerization. Moreover, the use of a mixture of monomers facilitates the development of crosslinking which imparts good stability to the resultant polymer.

The sizing composition deposited on the filaments should have a minimum content of constituents which can be polymerized and/or crosslinked; this content is preferably at least 70 weight %. The sizing composition deposited on the filaments within the context of the process according to the invention generally comprises between 75 and 100 weight % of constituents which can be polymerized and/or crosslinked.

In the majority of cases the sizing composition deposited on the filaments is depleted of solvent. It may sometimes comprise a small quantity of solvent which is then organic. Organic solvents are sometimes necessary for dissolving particular constituents which can be polymerized and/or crosslinked. The solvent may also be water, introduced in most cases by hydrated or hydrolysed constituents. The amount of solvents, if any, is less than 5 wt % preferably less than 3 wt %, more preferably, less than 1 wt %. The presence of these solvents in limited amounts does not require particular treatments in order to eliminate them.

The sizing composition deposited on the filaments is also characterized by the possible presence of small amounts of a film-forming agent. The content of the film forming agent, which is less than 10 wt %, is insufficient for them to play the conventional role of bonding agents and impart any integrity to the strand. This content is most frequently less than 5 wt %. In small quantities, film-forming agents can facilitate the fiber-drawing process at a given drawing speed and for a given diameter of the drawn filaments. Thus, when the filaments are very fine and the drawing speeds high, the presence of a film-forming agent attenuates the rubbing of the filaments against the sizing composition-depositing device. The film-forming agent used within the context of the invention are preferably derivatives of silicones and/or siloxanes.

The sizing composition deposited on the filaments can also comprise a coupling agent such as an organo-silane. The content of silane in the sizing composition may be as much as 15 wt % thereof. The coupling agent is not essential within the context of the invention.

The sizing composition deposited on the filaments can also comprise a lubricant. Lubricants are introduced into the sizing composition, in particular, if the strand thus sized is intended for textile applications. These agents are preferably fatty esters or glycol esters. Their content by weight preferably does not exceed 8%; above approximately 8%, when the sized strand is in contact with an organic substrate, these lubricants can migrate into the substance and then possibly risk acting as a catalyst for oxidation or hydrolysis. This phenomenon is manifested by accelerated ageing of the composite material produced or may cause adherence defects.

Depending on the purpose for which the strand produced according to the invention is intended, the sizing composition may possibly comprise relatively high proportions of initiators and/or catalysts for polymerization by heat treatment. A high content of polymerization catalysts and/or initiators can impair the stability of the sizing composition; this is the reason for which this content generally does not exceed 4 weight % in the absence of stabilizers acting as polymerization retardants.

As indicated above, the sizing composition can comprise stabilizers acting as polymerization retardants. These stabilizers are introduced into the sizing composition in particular when it is necessary to avoid given constituents reacting spontaneously with one another during the fiber-drawing operation. In general their content in the sizing composition deposited on the filaments does not exceed 3 wt %.

The sizing composition deposited on the filaments is distributed very rapidly over their entire surface and forms a true protective film for each of them. During the stage in which the wound package is produced, the strand forming the latter consists of filaments which can possibly slide over one another and move apart from one another. The strand produced according to the invention is not integral in the usual sense of the word, i.e. it does not consist of filaments secured to one another by virtue of a bonding connection brought about by one or more film-forming constituents of the sizing composition.

In spite of being in this form, the strand according to the invention is easily extracted from its wound package, without recourse to a previous treatment for polymerizing the sizing composition, as is the case with a strand coated with a sizing composition of which the content of film-forming agent is relatively high. This lack of integrity of the strand, in the conventional sense of the word, is important in so far as it encourages impregnation by the organic substrate with which it is ultimately associated.

However, if the strand is to be subjected to high mechanical stresses during its use, for example during weaving operations, it is preferable beforehand to polymerize the sizing composition coating the strand. This can be brought about by subjecting the wound package to a heat treatment. The strand then has sufficient integrity, in the usual sense of the word, to withstand stresses of this type.

In this case, the sizing composition used preferably comprises a polymerization catalyst and/or initiator. Likewise in this case the amount of sizing composition deposited on the filaments must be such that the weight of the sizing composition should remain less than approximately 5% of the total weight of the wound package. In effect, beyond this upper limit, the bonding of the strands to one another in the wound package is rendered useless.

Moreover, if the wound package is subsequently to be subjected to a heat treatment, the turns of the strand constituting it must have an angle of intersection of at least 1.5°. What is to be understood by the term "angle of intersection" is the angle which exists between the turns of the strand in two consecutive layers and of which the bisecting line is in a plane perpendicular to the axis of the wound package.

In effect, during the initial phase of this treatment, the increase in temperature causes a temporary reduction in the viscosity of the sizing composition before the polymerization reactions come into play. If the intersection of the wound package is zero or low, the turns of the strand are joined or at least in contact over a large part of their length and the sizing composition tends to connect the adjacent turns. At the end of the heat treatment the bonding areas between the adjacent turns are large and the wound package is useless. When the angle of intersection of the strand is at least 1.5°, the bonding areas are considerably smaller and do not prevent the extraction of the strand.

The glass stands forming the wound packages produced according to the present invention consist of continuous filaments of which the average diameter can vary between 5 and 24 μm. When the wound package has been subjected to a heat treatment the strand extracted from the wound package has an ignition loss of less than 5 wt %.

In order to reduce the tension to which the filaments are subject during the drawing process, it is preferable to dispose thereon a sizing composition having a viscosity which is less than or equal to approximately 400 centipoise. A viscosity of this level can be attained in particular by selecting the monomers used in the sizing composition composition and/or by metering their proportion relative to all the compounds which can be polymerized and/or crosslinked.

Having generally described this invention, a further understanding can be obtained by reference to certain specific examples which are provided herein for purposes of illustration only and are not intended to be limiting unless otherwise specified.

The glass strands described below are formed by mechanically drawing thin streams of molten glass flowing from apertures in a die plate according to a method well-known to the person skilled in the art. The glass used is an alumino-borosilicate practically depleted of alkaline oxides and known by the name of E glass.

The resultant filaments, 14 μm in diameter, are coated with a sizing composition according to the invention by means of a 40 mm diameter sizing roller rotating at a speed of 110 revolutions per minute, the temperature of the sizing composition being ambient temperature. The strands produced by collection of the filaments are wound into wound packages of which the angles of intersection vary between 10° and 16°.

EXAMPLE 1

In this example the sizing composition deposited on the filaments has the following composition by weight:

| Constituents with a molecular weight of less than 750 (monomers): | |
|---|---|
| lauryl acrylate[1] | 24% |
| aliphatic alkoxy diacrylate ester[2] | 21% |
| triethoxylated trimethylol propane triacrylate[3] | 23% |
| acrylated epoxidised bisphenol A[4] | 20% |
| Initiator: | |
| di-tert-butyl peroxide[5] | 2% |
| Coupling agent: | |
| gamma-glycidoxy propyl trimethoxy silane[6] | 10% |

This sizing composition has a viscosity of 48 cP. The sized strands are wound into wound packages weighing approximately 13 kg. These wound packages are subjected to the following heat treatment: 130° C. for 5 hours then 140° C. for 4 hours.

The strands extracted from these wound packages have an average titre of 332 tex and their ignition loss is 0.74%.

The resistance to abrasion of these strands is assessed by weighing the quantity of fuzz formed after passing these fibers over a series of rods. Expressed as milligrams of fuzz per kilogram of fiber tested, the average quantity of fuzz is 57 mg.

EXAMPLE 2

In this example the sizing composition deposited on the filaments has the following composition by weight:

| Constituents with a molecular weight of less than 750 (monomers): | |
|---|---|
| triopropylene glycol diacrylate[7] | 24% |
| dipropoxylated neopentyl glycol diacrylate[8] | 21% |
| triethoxylated trimethylol propane triacrylate[3] | 23% |
| Constituents with a molecular weight of more than 750 (monomers): | |
| epoxy acrylate resin on bisphenol A[9] | 13% |
| Initiator: | |
| tert-butyl and cumyl peroxide[10] | 2% |
| Coupling agent: | |
| gamma-glycidoxy propyl trimethoxy silane[6] | 10% |

This sizing composition has a viscosity of 60 cP. The sized strands are wound into wound packages weighing approximately 13 kg. These wound packages are subjected to a heat treatment of 140° C. for 8 hours.

The strands extracted from these wound packages have an average titre of 325 tex and their ignition loss is 0.66%.

Expressed as milligrams of fuzz per kilogram of strand tested, the average quantity of fuzz is 62 mg.

EXAMPLE 3

In this example, the sizing composition deposited on the filaments has the following composition by weight:

| Constituents with a molecular weight of less than 750 (monomers): | |
|---|---|
| dipropoxylated neopentyl glycol diacrylate[8] | 31% |
| triopropylene glycol diacrylate[7] | 32% |
| Constituents with a molecular weight of more than 750: | |
| aromatic polyurethane acrylate oligomer[11] | 25% |
| Initiator: | |
| tert-butyl and cumyl peroxide[10] | 2% |
| Coupling agent: | |
| gamma-glycidoxy propyl trimethoxy silane[6] | 10% |

This sizing composition has a viscosity of 78 cP. The sized strands are wound into wound packages weighing approximately 13 kg. These wound packages are subjected to a heat treatment of 160° C. for 8 hours.

The strands extracted from these wound packages have an average titre of 320 tex and their ignition loss is 0.54%.

Expressed as milligrams of fuzz per kilogram of strand tested, the average quantity of fuzz is 41 mg.

EXAMPLE 4

In this example, the sizing composition deposited on the filaments has the following composition by weight:

| Constituents with a molecular weight of less than 750 (monomers): | |
|---|---|
| triacrylate ester[12] | 28% |
| 2(2-ethoxy ethoxy) ethyl acrylate[13] | 30% |
| hexanediol diacrylate[14] | 25% |
| Coupling agent: | |
| gamma-glycidoxy propyl trimethoxy silane[6] | 12% |
| Lubricant: | |
| isopropyl palmitate | 5% |

The wound packages of strands sized in this manner are not subjected to a polymerizing heat treatment.

EXAMPLE 5

In this example, the sizing composition deposited on the filaments has the following composition by weight:

| Constituents with a molecular weight of less than 750 (monomers): | |
|---|---|
| 2(2-ethoxy ethoxy) ethylacrylate[13] | 21% |
| triethylene glycol divinyl ether[15] | 23% |
| ethoxylated trimethylol propane triacrylate[7] | 20% |
| Constituent with a molecular weight of more than 750: | |
| aromatic epoxy-based acrylate resin[16] | 20% |
| Initiator: | |
| tert-butyl peroxbenzoate[17] | 2% |
| Coupling agent: | |
| aminopropyltriethoxysilane[18] | 10% |
| Lubricating agent: | |
| isopropyl palmitate | 4% |

This sizing composition has a viscosity of 40 cP at 37° C.

EXAMPLE 6

The composition by weight of the sizing composition deposited on the filaments is as follows:

| Constituents with a molecular weight of less than 750 (monomers): | |
|---|---|
| 2(2-ethoxy ethoxy) ethylacrylate[13] | 25% |
| triethylene glycol divinyl ether[15] | 29% |
| triacrylate ester[12] | 29% |
| Initiator: | |
| tert-butyl peroxbenzoate[17] | 3% |

| Coupling agent: | |
|---|---|
| aminopropyltriethoxysilane[18] | 10% |
| Lubricating agent: | |
| isopropyl palmitate | 4% |

This sizing composition has a viscosity of 24 cP at 25° C.

Within the context of examples 5 and 6, almost identical wound packages are produced after a winding time of 20 minutes. These wound packages, which have an average angle of intersection of 16°, are then heat-treated during which they are subjected to a temperature of 130° for approximately 180 minutes.

Strands extracted from a wound package produced within the context of example 5 have an average titre of 330 tex and their ignition loss is 0.75%.

Strands extracted from a wound package produced within the context of example 6 have an average titre of 342 tex and their ignition loss is 0.70%.

The resistance to abrasion of strands extracted from these wound packages is assessed by weighing the quantity of fuzz formed after the strands have passed over different series of rods. Expressed as milligrams of fuzz per kilogram of strand tested, the average quantity of fuzz weighed at the end of these tests varies between 8 and 50 mg/kg for these two types of strand. By way of comparison, a control strand having similar characteristics but coated with an aqueous sizing composition comprising an epoxy resin emulation, silanes and cationic surfactants and dried in usual conditions forms between 200 and 500 mg of fuzz per kg of strand.

Plaques of parallel strands are formed in accordance with standard NF 57 152 from these same strands. The resin used is epoxy resin CY205 marketed under this reference by CIBA GEIGY.

The mechanical properties of these plaques in terms of bending and shear are measured according to standards ISO 178 and ISO 4585 respectively. These properties are measured before ageing and after immersion of the plaques in water at 98° C. for 72 hours. These properties are compared below with those of the plaques with parallel strands produced from the same control strand as was used for the test for resistance to abrasion.

The results obtained with 8 to 10 test pieces for each type of strand compared with plaques having identical contents by weight of glass are as follows:

| | Ex. 1 | Ex. 2 | Control |
|---|---|---|---|
| Breaking stress on bending (MPa) | | | |
| Before ageing (MPa) | 2376 | 2369 | 2280 |
| | 75 | 50 | 40 |
| After ageing (MPa) | 1563 | 1635 | 1400 |
| | 73 | 24 | 20 |
| Breaking stress on shearing (MPa) | | | |
| Before ageing (MPa) | 64.0 | 67.2 | 69.5 |
| | 1.4 | 0.8 | 1.0 |
| After ageing (MPa) | 32.2 | 43.3 | 40.0 |
| | 1.0 | 1.2 | 0.4 |

These results show that the composite parts made from the strands produced according to the invention have properties which are as good as and, at least as far as some of them are concerned, better than those of parts produced from conventional strands.

The stands according to the invention are particularly recommended for all textile applications, however their principal use is still the reinforcement of various substances in order to produce composite products. These substances may be mineral, such as cement-based mixtures, or organic.

References:
(1) Marketed under the reference "SR 335" by CRAY-VALLEY
(2) Marketed under the reference "SR 9209" by CRAY-VALLEY
(3) Marketed under the reference "SR 454" by CRAY-VALLEY
(4) Marketed under the reference "Ebecryl 3605" by UNION CHIMIQUE BELGE
(5) Marketed under the reference "Trigonox B" by AKEO
(6) Marketed under the reference "Silane A 187" by OSI SPECIALTIES S. A.
(7) Marketed under the reference "TPGDA" by UNION CHIMIQUE BELGE
(8) Marketed under the reference "SR 9003" by CRAY-VALLEY
(9) Marketed under the reference "CN 104" by CRAY-VALLEY
(10) Marketed under the reference "Trigonox T" by AKEO
(11) Marketed under the reference "Actilane 17" by AKCROS
(12) Marketed under the reference "Photomer 4171" by AKCROS
(13) Marketed under the reference "SR 256" by CRAY-VALLEY
(14) Marketed under the reference "HDOA" BY UNION CHIMIQUE BELGE
(15) Marketed under the reference "DVE 3" by INTERNATIONAL SPECIALTY PRODUCTS
(16) Marketed under the reference "Photomer 3016" by AKCROS
(17) Marketed under the reference "Trigonox C" by AKEO
(18) Marketed under the reference "Silane A 1100" by OSI SPECIALTIES S.A.

Obviously, numerous modifications and variations of the present invention are possible in light of the above teachings. It is therefore to be understood that within the scope of the appended claims, the invention may be practiced otherwise than as specifically described herein.

This application is based on FR 93/14795, filed in France on Dec. 9, 1993, the entire contents of which are hereby incorporated by reference.

What is claimed as new and is desired to be secured by Letters Patent of the United States is:

1. A process for manufacturing glass strands comprising:
   i) mechanically drawing continuous filaments from thin streams of molten glass flowing from apertures provided in a base of a die plate;
   ii) collecting said filaments to form a strand or strands which are collected on a support, wherein a surface of said filaments is coated with a sizing composition while said filaments are being drawn, wherein said sizing composition has a solvent content less than 5 wt %, and wherein said sizing composition comprises a mixture of constituents which can be polymerized and/or crosslinked by heat treatment, at least 60 wt % of the constituents having a molecular weight (Mw) less than 750, less than 10 wt % being film-forming agents and 0 to 25 wt % being a member selected from the group consisting of a coupling agent, a lubricant, a stabilizer, an initiator, a catalyst for polymerization by heat treatment and a mixture thereof, and wherein said solvent is selected from the group consisting of an organic solvent and water; and
   iii) winding said strand or strands, formed by collection of said filaments, on a rotating support so as to form a wound package consisting of turns of strand coated with a non-polymerized sizing composition,
wherein said sizing composition comprises at least 70 wt. % of constituents which can be polymerize and/or crosslinked.

2. The process of claim 1, wherein at least 60 wt % of said sizing composition is formed of constituents having a molecular weight (Mw) less than approximately 500.

3. The process of claim 1, wherein at least 60 wt % of said constituents of said mixture are monomers.

4. The process of claim 1, wherein between 75 and 100 wt % of said constituents of said sizing composition can be polymerized and/or crosslinked.

5. The process of claim 1, wherein said sizing composition is depleted of solvent prior to being coated on said filaments.

6. The process of claim 1, wherein said sizing composition further comprises up to 5 wt % of a film-forming agent selected from the group consisting of derivatives of silicones, siloxanes and mixtures thereof.

7. The process of claim 1, wherein said sizing composition further comprises up to 15 wt % of an organo silane coupling agent.

8. The process of claim 1, wherein said sizing composition further comprises up to 8 wt % of a lubricant.

9. The process of claim 1, wherein said sizing composition further comprises up to 4 wt % of a polymerization catalyst or an initiator.

10. The process of claim 1, wherein said sizing composition further comprises up to 3 wt % of a stabilizer.

11. The process of claim 1, wherein said wound package comprises less than 5 wt % of said sizing composition.

12. The process of claim 1, wherein said wound package is formed by observing an angle of intersection of at least 1.5°.

13. The process of claim 12, wherein said wound package thus produced is subjected to a heat treatment so as to cause said sizing composition to polymerize.

14. The process of claim 1, wherein a viscosity of said sizing composition is less than or equal to 400 cP.

* * * * *